United States Patent [19]
Inoue

[11] Patent Number: 6,009,227
[45] Date of Patent: Dec. 28, 1999

[54] HDTV DIGITAL RECORDER WITH COMPRESSED IMAGE DATA INSERTED IN A VIDEO SIGNAL THAT CORRESPONDS TO A VIDEO INTERFACE STANDARD

[75] Inventor: Takao Inoue, Kanagawa, Japan

[73] Assignee: Sony Corporation, Tokyo, Japan

[21] Appl. No.: 08/819,657

[22] Filed: Mar. 17, 1997

[30] Foreign Application Priority Data

Mar. 21, 1996 [JP] Japan ............................. P08-064409

[51] Int. Cl.⁶ ........................................ H04N 5/76
[52] U.S. Cl. ......................... 386/52; 386/112; 386/124
[58] Field of Search ............................. 386/46, 52, 68, 386/95, 56, 65, 109, 111, 112, 123, 131, 124; 348/432, 433, 845, 845.1; H04N 5/76, 5/92

[56] References Cited

U.S. PATENT DOCUMENTS

| | | | |
|---|---|---|---|
| 5,581,360 | 12/1996 | Matsumura et al. | 386/46 |
| 5,729,649 | 3/1998 | Lane et al. | 386/68 |
| 5,731,922 | 3/1998 | Yamasaki et al. | 386/52 |

*Primary Examiner*—Huy Nguyen
*Attorney, Agent, or Firm*—Jay H. Maioli

[57] ABSTRACT

A signal processing method and apparatus wherein digital image data is compressed, recorded, and edited and where multiple playback/record cycles do not degrade the quality of the image. Digital image signals are compressed and recorded by a digital VTR. The recorded signals are then played back and the resulting signal is decompressed along one data path or inserted into a standard video interface format signal along a second data path. The compressed image signal in the standard video format may then be edited as if it were a standard video signal. The compressed video signal is then extracted from the standard interface signal and rerecorded. The compressed signal can be edited without decompression and recompression, thus maintaining the quality of the image data.

9 Claims, 10 Drawing Sheets

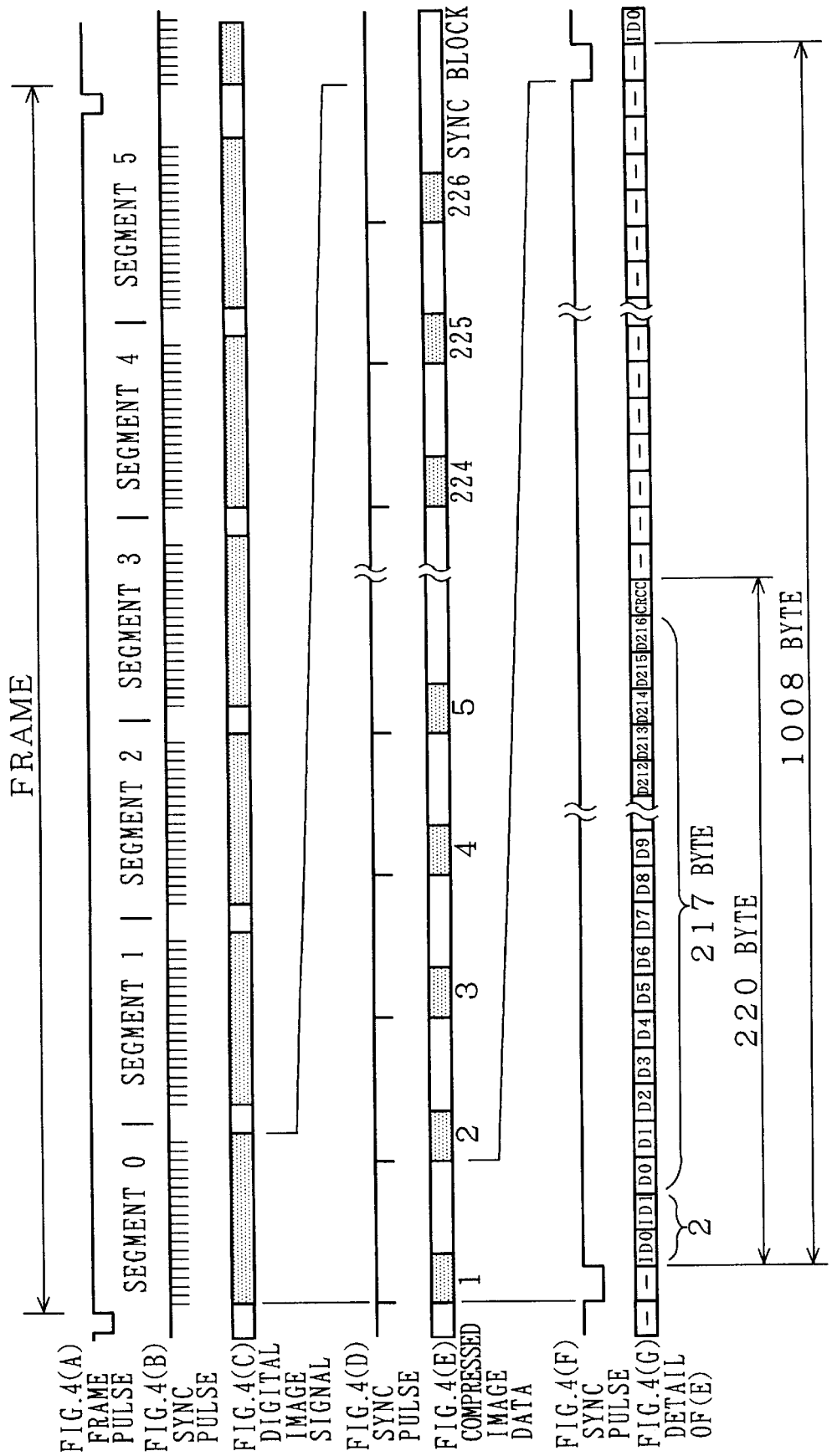

| | |
|---|---|
| MSB | BLOCK ADDRESS 7 |
| 6 | BLOCK ADDRESS 6 |
| 5 | BLOCK ADDRESS 5 |
| 4 | BLOCK ADDRESS 4 |
| 3 | BLOCK ADDRESS 3 |
| 2 | BLOCK ADDRESS 2 |
| 1 | BLOCK ADDRESS 1 |
| LSB | BLOCK ADDRESS 0 |

| | |
|---|---|
| MSB | SYNC BLOCK ERROR FLAG |
| 6 | SQ = 0 |
| 5 | FRAME DCT=0, FIELD DCT=1 |
| 4 | SEGMENT ADDRESS 2 |
| 3 | SEGMENT ADDRESS 1 |
| 2 | SEGMENT ADDRESS 0 |
| 1 | TRACK NUMBER |
| LSB | VIDEO SECTOR=0, AUDIO SECTOR=1 |

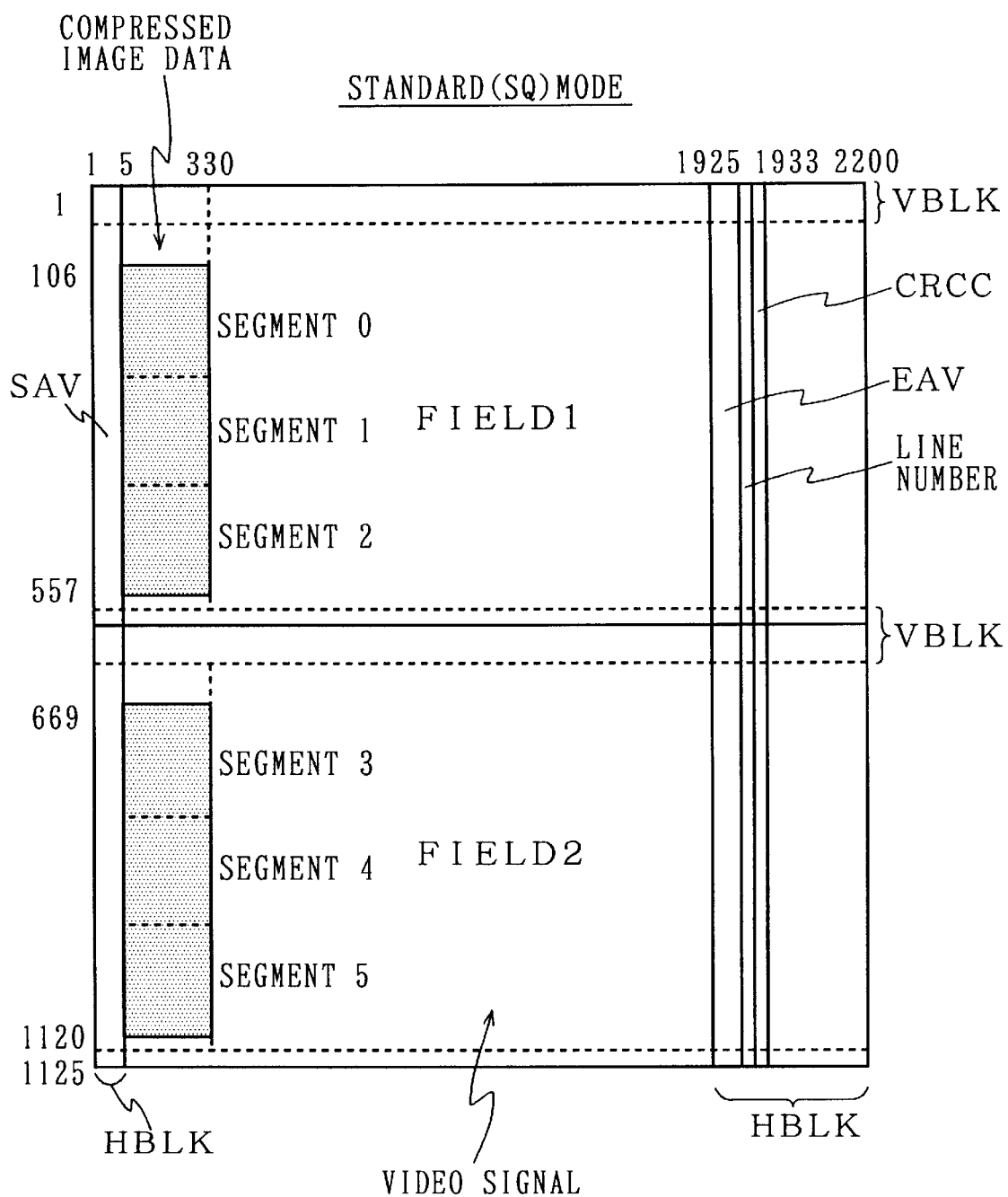

FIG. 8

| Y DATA | 3FF | 000 | 000 | XYZ | COMPRESSED DATA | 3FF | 000 | 000 | XYZ | LN0 | LN1 | CR0 | CR1 |
|---|---|---|---|---|---|---|---|---|---|---|---|---|---|
| | SAV | | | | | EAV | | | | LINE No | | CRCC | |

1.5 SYNC BLOCK

| | | | | | | | | |
|---|---|---|---|---|---|---|---|---|
| BIT 9 | NOT BIT 8 | NOT BIT 8 | NOT BIT 8 | NOT BIT 8 | NOT BIT 8 | NOT BIT 8 | NOT BIT 8 | NOT BIT 8 |
| BIT 8 | EVEN PARITY | EVEN PARITY | EVEN PARITY | EVEN PARITY | EVEN PARITY | EVEN PARITY | EVEN PARITY | EVEN PARITY |
| BIT 7 | ID0-7 | ID1-7 | D0-7 | D1-7 | D216-7 | CRCC-7 | ID0-7 | ID1-7 | D0-7 |
| BIT 6 | ID0-6 | ID1-6 | D0-6 | D1-6 | D216-6 | CRCC-6 | ID0-6 | ID1-6 | D0-6 |
| BIT 5 | ID0-5 | ID1-5 | D0-5 | D1-5 | D216-5 | CRCC-5 | ID0-5 | ID1-5 | D0-5 |
| BIT 4 | ID0-4 | ID1-4 | D0-4 | D1-4 | D216-4 | CRCC-4 | ID0-4 | ID1-4 | D0-4 |
| BIT 3 | ID0-3 | ID1-3 | D0-3 | D1-3 | D216-3 | CRCC-3 | ID0-3 | ID1-3 | D0-3 |
| BIT 2 | ID0-2 | ID1-2 | D0-2 | D1-2 | D216-2 | CRCC-2 | ID0-2 | ID1-2 | D0-2 |
| BIT 1 | ID0-1 | ID1-1 | D0-1 | D1-1 | D216-1 | CRCC-1 | ID0-1 | ID1-1 | D0-1 |
| BIT 0 | ID0-0 | ID1-0 | D0-0 | D1-0 | D216-0 | CRCC-0 | ID0-0 | ID1-0 | D0-0 |

| | |
|---|---|
| NOT BIT 8 | NOT BIT 8 |
| EVEN PARITY | EVEN PARITY |
| ID1-7 | D109-7 |
| ID1-6 | D109-6 |
| ID1-5 | D109-5 |
| ID1-4 | D109-4 |
| ID1-3 | D109-3 |
| ID1-2 | D109-2 |
| ID1-1 | D109-1 |
| ID1-0 | D109-0 |

HDTV DIGITAL RECORDER WITH COMPRESSED IMAGE DATA INSERTED IN A VIDEO SIGNAL THAT CORRESPONDS TO A VIDEO INTERFACE STANDARD

BACKGROUND OF THE INVENTION

1. Field of the Invention

The present invention relates generally to a method and apparatus for transmitting and processing a video image signal and in particular, to a method and apparatus for transmitting and, processing compressed video image signals.

2. Description of Related Art

Systems for recording video signals for high definition television (HDTV) are known. High definition television video signals are made up of either an R/G/B signal, wherein each component has a bandwidth of 30 MHz, or an Y/Pb/Pr signal, wherein the luminance signal Y has a bandwidth of 30 MHz and the chrominance signals Pb and Pr have bandwidths of 15 MHz each. To digitize such signals without aliasing, a VTR sample frequency must be at least twice the signal bandwidth. Typically, digital VTRs for HDTV sample the luminance signal Y at 74.25 MHz and each of the chrominance signals Pb and Pr at 37.125 MHz. If these signals are quantized with an eight-bit resolution, the full data rate for a digitalized HDTV signal is 1.188 Gbps. This is a significant data rate.

There are commercial VTRs that can record at this rate, however, this equipment is expensive, consumes a significant amount of electrical power, and requires a large amount of magnetic tape to hold this data. Thus, recording uncompressed HDTV video images is impractical for compact video/camera combinations.

Data compression methods are known that can reduce the volume of data required to record a digital HDTV video signal. It is possible, therefore, to construct an HDTV-compatible VTR using compression methods at an acceptable cost and power consumption rate.

To effectively reduce the data set required to reconstruct an HDTV video image, data compression methods typically involve some loss of image data. Image quality loss is generally confined to features of the image that are not readily distinguishable by human vision. The image resulting after decompression is visually acceptable as an HDTV image.

A problem arises when compressed video images are edited. The compressed video signal must be decompressed or expanded before it can be edited. The edited signal must then be compressed again for storage. Each compression/decompression cycle results in additional loss of signal information. As a result, the video image is degraded.

Signal formats for compressed and uncompressed video signals are not generally compatible. For a compressed video signal to be transferred from one VTR to another it must first be decompressed and then converted to a standard format. For HDTV, the BTA S-002 (bit parallel digital interface standard) or the BTA S-004 (bit serial digital interface standard) standards are typically used to transfer uncompressed video signals. The uncompressed signal is then transferred to the second VTR where it is compressed and recorded onto a recording medium. Again, additional compression/decompression cycles reduce the quality of the image and limit the utility of the editing system.

The system shown in FIG. 11 illustrates the operation of a conventional video recording system. When a digital image signal according to a standard format, for example, the BTA S-004 standard, is applied to a terminal 1, this digital image signal is converted into a parallel signal by a serial-to-parallel conversion circuit 2 and then applied to an encoder 3 that compresses the image data. The compressed image data are recorded by a recording/playing apparatus, such as a digital VTR 5.

To play back the image, a decoder 6 expands the digital compressed image signal from the VTR 5 and a parallel-to-serial conversion circuit 7 converts the expanded signal to a serial digital image signal that satisfies the interface standard.

If a signal process operation such as a copy operation is repeated by this digital signal process system, the image quality is degraded because of the repeated encoding and decoding processes.

Directly copying compressed image signals from one VTR to another would add to the complexity of the system. The compressed image data do not comply with the interface standards used for uncompressed images so that the compressed and uncompressed digital image signals must be treated differently. Handling two kinds of data signals adds complexity to the construction of a digital editing system.

OBJECTS AND SUMMARY OF THE INVENTION

The present invention resolves the aforementioned disadvantages of the prior art and provides a method of transmitting a digital compressed image signal according to the same standard signal format as uncompressed video signals and provides a method and apparatus for editing the compressed video image, so that the image quality is not degraded by repeated compression/decompression cycles.

A first object of the present invention is to provide a method and apparatus for storing and editing compressed video signals where only compressed image signals are manipulated during editing, so that no additional loss of image quality results from the editing operation.

It is a second object of the present invention to provide a method and apparatus for editing and storing a video signal where the compressed signal is transmitted using a data format that is compatible with uncompressed signal formats, so that compressed video signals may be transmitted among various pieces of equipment using standard interface formats.

An embodiment of the present invention disclose a method and apparatus for receiving, storing and manipulating video signals where uncompressed video signals are compressed, coupled with an error correcting code and stored.

Stored images are then recovered from the storage medium, error corrected and either decompressed, to provide an output image, or transmitted in a compressed state. Transmitted compressed signals may then be again stored on the recording medium. The result is that compressed images can be recovered from the storage medium, edited, and stored again without a loss of image quality.

Transmission of the video signal is accomplished by inserting the compressed image data into a signal interface format compatible with uncompressed video data. The resulting signal may be transmitted using equipment compatible with the uncompressed signal. The compressed signal is received by a VTR, separated from the signal headers associated with the interface standard, appended with error correction data, and stored.

BRIEF DESCRIPTION OF THE DRAWINGS

FIGS. 4(A) through 4(G) are timing diagrams illustrating the recording of a sync block stream used in the embodiment of FIG. 1.

FIGS. 5(A) and 5(B) illustrate identification signals used in the embodiment of FIG. 1.

FIG. 7 shows the multiplexed position of the digital compressed image data in the embodiment of FIG. 1.

FIG. 8 illustrates the data stream in the embodiment of FIG. 1 where one line of compressed image data is inserted between timing signals.

DETAILED DESCRIPTION OF THE PREFERRED EMBODIMENTS

A first embodiment of the present invention will be described with reference to the drawings.

Figure 1:
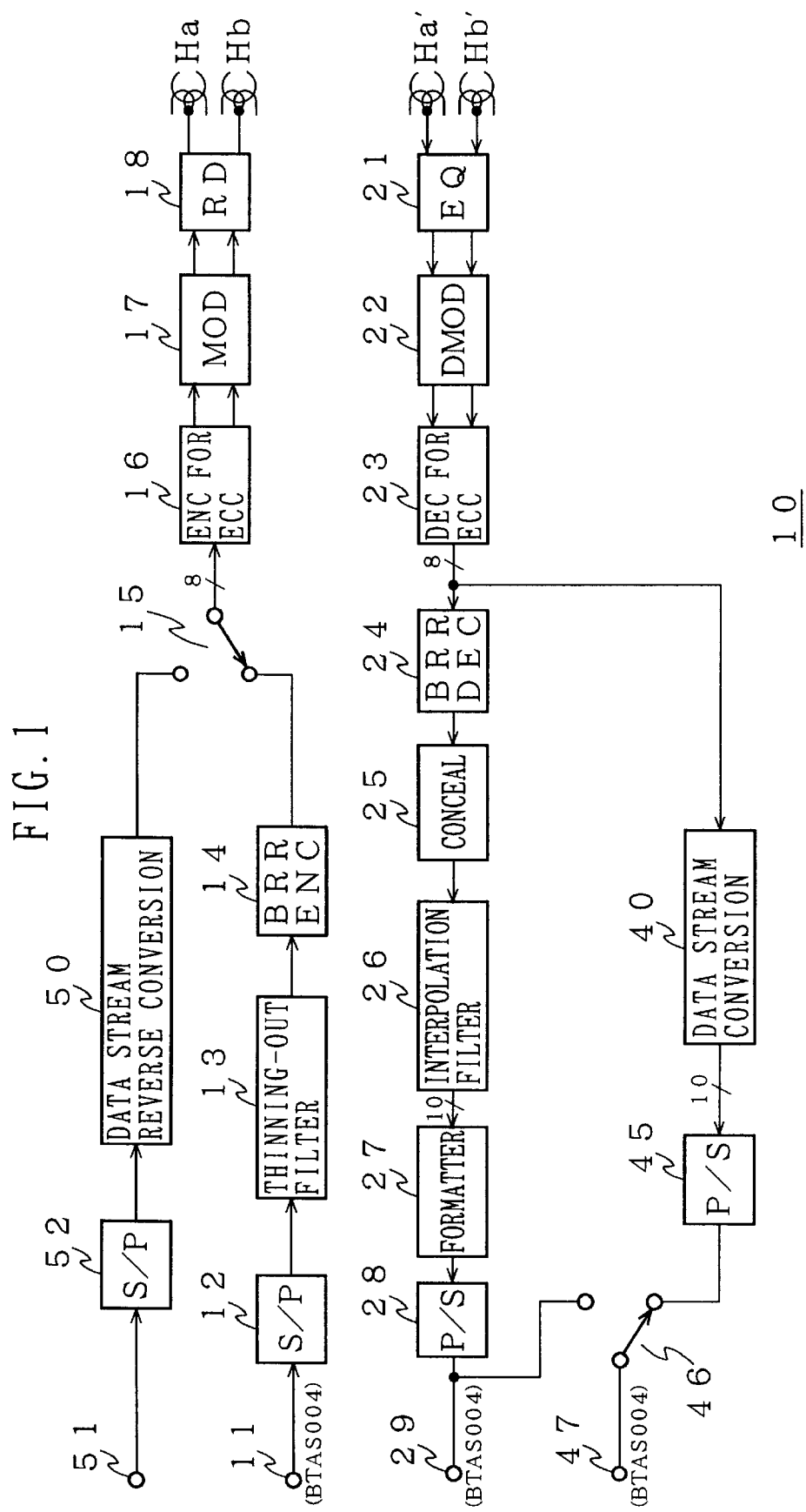
FIG. 1 is a block diagram of a digital VTR according to an embodiment of the present invention.

FIG. 1 is a block diagram of a VTR to which the present invention is applied. A first terminal 11 receives an uncompressed video image signal. The signal is formatted according to the BTA S-004 serial interface standard. A serial-to-parallel converter 12 converts the digital image signal to parallel data. A decimation filter (thinning-out filter) 13 limits the bandwidth of the image signal and reduces the number of samples to decrease the data volume.

Figure 2A:
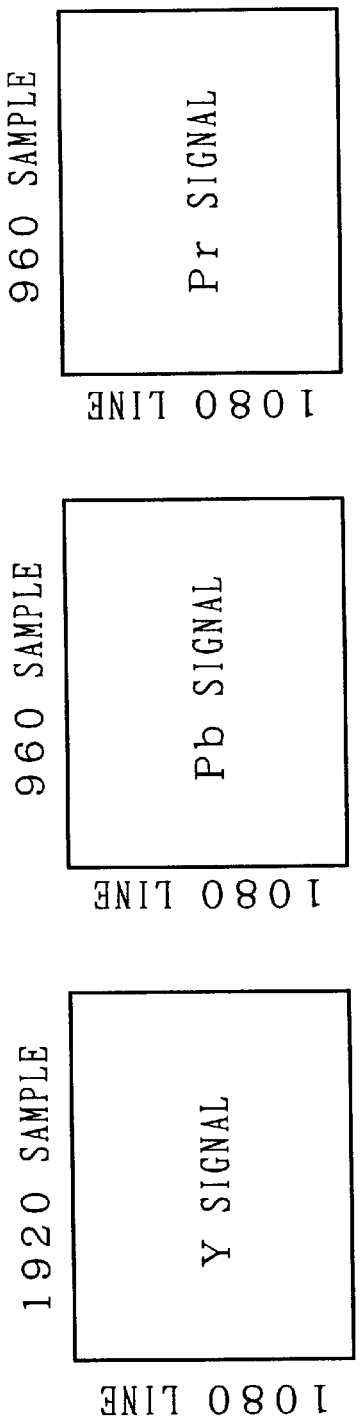
FIG. 2 is a diagram illustrating conversion of a sampling rate used in the embodiment of FIG. 1.
Figure 2B:
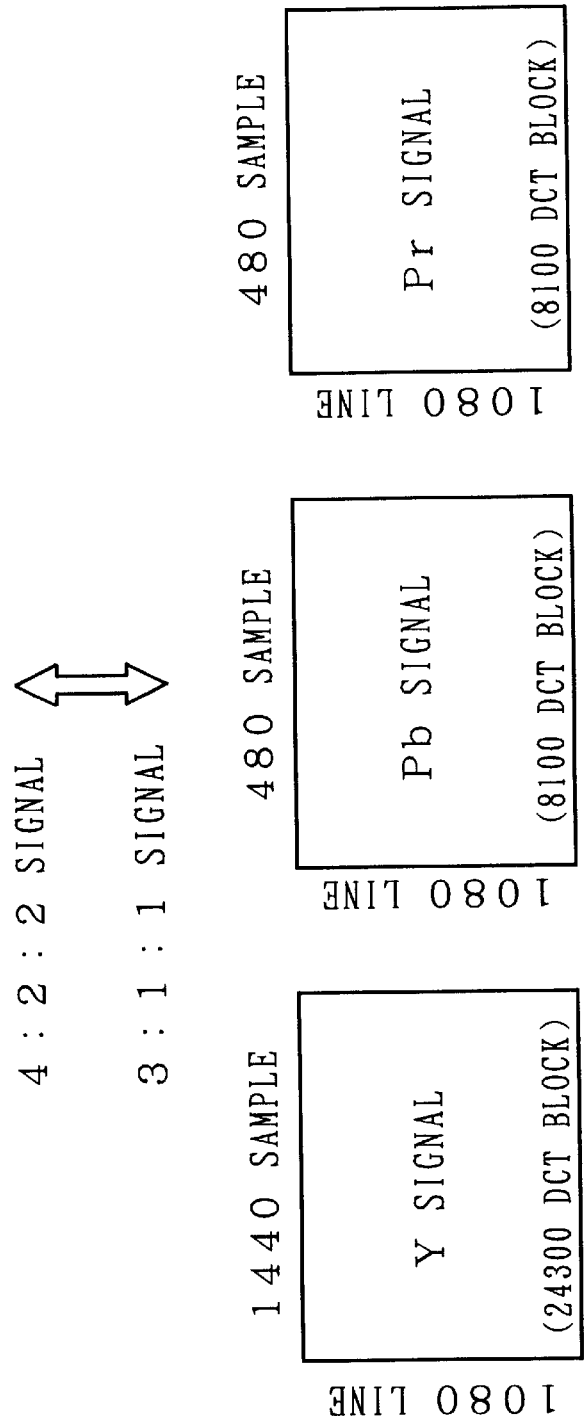

In the present embodiment, the image signal is sampled to create a 4:2:2 type signal. The input luminance signal has 1930 samples per line. The decimation filter 13 reduces this number by three fourths resulting in a signal with 1,440 samples per line. Chrominance signals, Pb and Pr, initially have a sample number of 960 per line. The decimation filter 13 reduces this by one half resulting in signals with 480 samples per line for each chrominance value. Overall, the data volume of the signal is reduced by five eights in the decimation filter 13 and the resulting signal is a 3:1:1 type signal, as shown in FIGS. 2(A) and 2(B).

A bit reduction encoder (bit rate reduction encoder) 14 receives the 3:1:1 signal from the decimation filter 13 and performs a compression operation to further reduce the data rate of the digital image signal. In the present embodiment the bit reduction encoder 14 performs a discrete cosine transform (DCT). Alternatively, other compression techniques might be used including discrete Fourier transform (DFT) or run-length encoding. DCT conversion is done on sixty-four pixel blocks formed of eight pixels in the horizontal direction and eight pixels in the vertical direction, where the signal has been quantized so that each pixel is represented by eight bits.

Data is then grouped into sets of fifteen DCT blocks comprising 960 bytes (Y:Pb:Pr=9:3:3) and compressed by a factor of 8/35. The result is that the compressed data stream consists of 217-byte record blocks. Each record block comprises a sync block.

Figure 3:
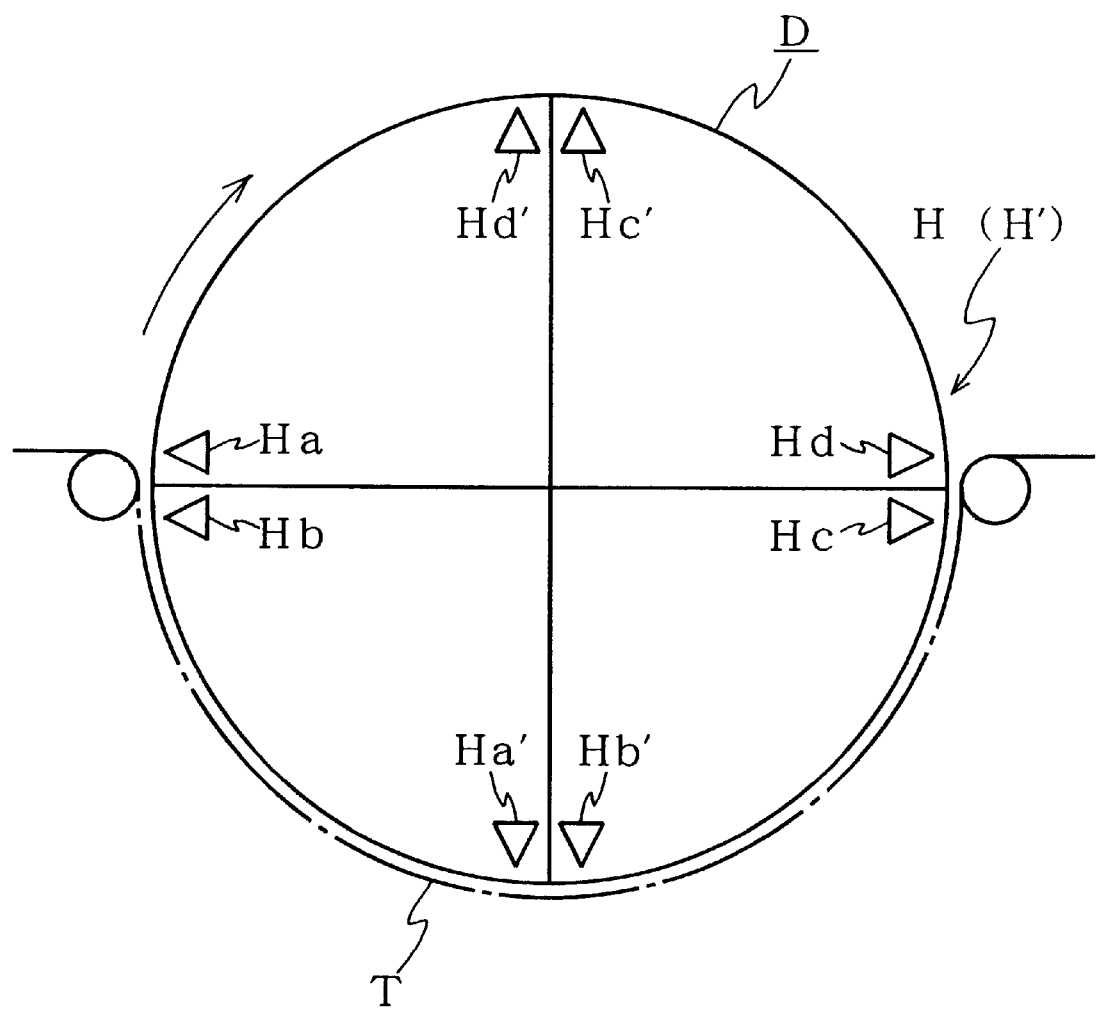
FIG. 3 shows a rotating magnetic recording head device.

FIG. 3 shows a recording head assembly that is used to record the compressed signal of the present embodiment onto a recording tape. Four recording heads Ha-Hd are mounted on a rotation drum D. Tape T is wound 180 degrees around the drum D.

Each frame of the signal consists of twelve segments divided into two channels, and each channel comprises six segments. One frame of the bandwidth limited HDTV signal consists of 40,500 DCT blocks as illustrated in FIG. 2(B). Therefore, each frame of the image signal consists of 3,375 DCT blocks and each segment consists of 225 sync blocks. An auxiliary data block (AUX data) containing formatting and error correcting information is added resulting in a total of 226 sync blocks for each segment of the recording signal. FIGS. 4(A)–4(G) show an example of one such frame.

When the compressed signal is recorded by the recording head shown in FIG. 3, each frame is divided into twelve segments. The segments comprising one channel are shown in FIG. 4(E). Recording heads Ha and Hb each record one channel of the image signal. Thus, recording a frame of an image signal requires that each head record six segments of data where each segment consists of 226 sync blocks, as shown in FIG. 4(E).

FIG. 4(C) shows the uncompressed video signal applied to terminal 11. This signal is applied to the decimation filter 13 and the bit reduction encoder 14 so that it is compressed to one seventh of its original size, as shown in FIG. 4(E).

FIG. 4(G) shows that two identification signals ID0, ID1 are added to the beginning of each 217 byte sync block of compressed image data. These ID signals contain address, format and error code data, as illustrated in FIGS. 5(A) and 5(B).

When an error occurs in a sync block, a sync block error flag is stored in the MSB bit of the identification signal ID1 as shown in FIG. 5(B). This flag is initially set to "0" indicating no error and is changed to "1" when the error occurs.

The compressed digital image signal from the bit reduction encoder 14 is applied through a switch 15 to an error correction code encoder 16 that adds an error correction code. A Reed Solomon code, for example, might be used.

A recording modulation circuit 17 modulates the digital image signal from the encoder 16 to produce a signal required by the characteristics of the recording head H and recording medium T. The signal is then recorded by the recording amplifier 18 on the magnetic tape T by the recording heads Ha-Hd, as shown in FIG. 3. The present embodiment describes recording the compressed signal onto tape, however, the recording medium may also be a disk.

A playback system according to the present embodiment will be described. The playback signal is detected by four playback heads H' (Ha'-Hd') shown in FIG. 3. This signal is shaped and amplified by an equalizer 21 that may include a restoring amplifier and a phase locked loop (PLL) circuit (not shown). The signal is restored to a digital signal by a demodulation circuit 22. An error correction decoder 23 corrects errors using the Read-Solomon code added by the error correction encoder 16.

The error corrected signal is applied to a bit rate reduction decoder 24. This decoder executes a reverse of the compression performed by the bit reduction encoder 14. In the present embodiment the decoder 24 performs a reverse DCT. The resulting signal has the same volume of data as the original signal after the operation of the decimation filter 13.

The digital image signal is then applied to an error concealing circuit 25. If an error in the compressed playback image data is not corrected by the error correction code decoder 23, then image data are estimated by the concealing circuit 25 using data from adjacent pixels or from previous image frames. The corrected data are applied to an interpolation digital filter 26 to reproduce the 4:2:2 type digital image signal.

The digital image signal is converted to a standard interface format by a formatter 27. Operation of the formatter 27 will be explained later with reference to the data stream conversion circuit 40.

The formatted digital image signal is converted to a serial data stream by a parallel-to-serial converter 28 and an uncompressed transmission signal conforming to the serial interface standard (BTAS-004) is output at terminal 29.

The present invention allows compressed video signals to be edited and copied using a signal derived from the data stream conversion circuit 40. During the editing process desired portions of this signal are processed by the data stream reverse-conversion means 50 and re-recorded. Because this signal is not decompressed and recompressed there is no loss of image quality.

The data stream conversion circuit 40 in the playback system will be discussed. Playback data has a format shown in FIGS. 4(E) and 4(F). The data stream conversion circuit 40 processes the playback data by converting the clock rate, matching the data phase with an image signal area of a standard signal format and adding CRCC and parity data as the error detection codes. The resulting signal is compatible with one of the interface standards discussed above.

Figure 6:
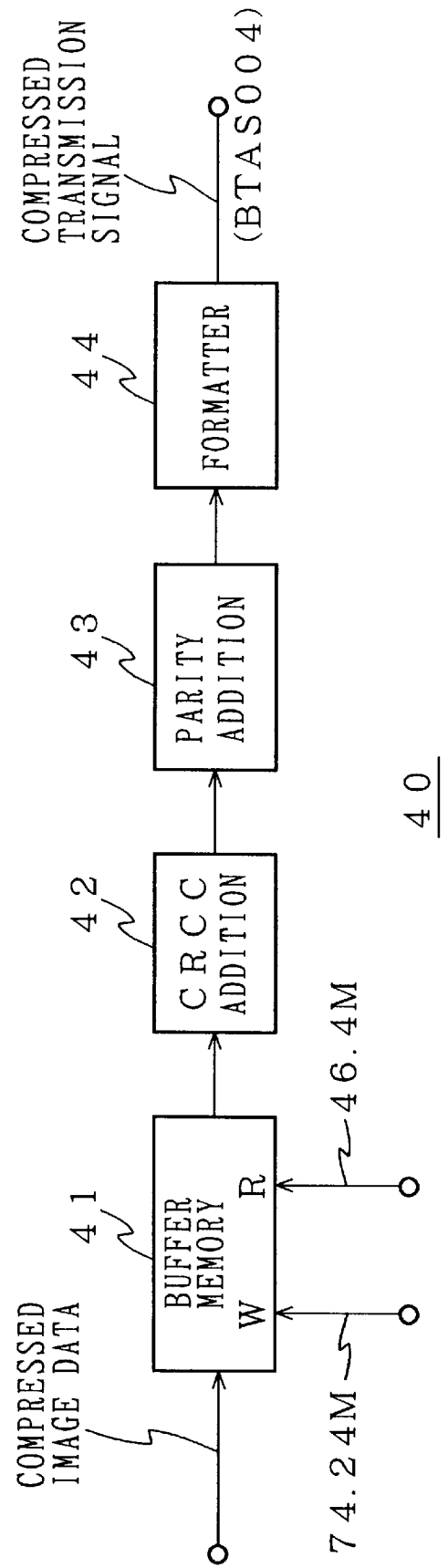
FIG. 6 is a block diagram of the data stream conversion circuit used in the embodiment of FIG. 1.

FIG. 6 is a detailed block diagram of the data stream conversion circuit 40. The playback signal (compressed image data) from the error correction decoder 23 is a series of sync blocks as shown in FIGS. 4(E) and 4(G). Because the data has been compressed, the number of clock cycles required to read out the segment data is a fraction of the number of clock cycles encompassed by the length of the segment.

A buffer memory 41, as shown in FIG. 6, is used to generate a data stream with a clock rate of 74.25 MHZ that is required for the interface standard. The compressed data is written into the memory 41 at 46.4 MHZ and is read out at 74.25 MHZ.

FIG. 7 shows the resulting image signal after conversion of the clock rate by the buffer memory 41. The image data shown at the left edge of the video field occupies one seventh of the regular screen reflecting the compression ratio of the compressed signal.

Timing of the buffer memory 41 is controlled so that a delay is introduced that compensates the time required for the image processing operations performed by the bit rate reduction decoder 24, the concealing circuit 25, the interpolation filter 26, and the formatter 27 in FIG. 1. As a result, the compressed image data output from the formatter 44 shown in FIG. 6 is synchronous with the uncompressed output of the formatter 27 shown in FIG. 1. Thus, editing operations may be performed on the compressed signal while the uncompressed image is observed on a video monitor (not shown).

After clock rate conversion, the image data is applied to an error detection code adding circuit 42 where an error detecting code is calculated and added to the signal. In this embodiment a CRCC code is used. The CRCC is calculated for 219 bytes of data, that is, the identification codes ID0 and ID1 at the head portion plus the 217 bytes of image data, as shown in FIG. 4G. The calculated result is stored in the 220th byte.

A parity addition circuit 43 derives an even parity of eight-bit CRCC data in this example and the result is added as a ninth bit. Even parity for inverted data is then derived and this is added as a tenth bit in order to establish a ten-bit error code as required for the interface standard. The addition of the inverted parity bit allows error detection without using an inhibit code defined by the standard.

Finally, the formatter 44 produces the standard data stream shown in FIG. 8. In the representation of the video signal shown in FIG. 7, the compressed image data are substituted for regular image data in a 330-pixel wide area (about one seventh of one line) at the beginning of each horizontal line.

The compressed image data of 330 bytes (equivalent to 1.5 sync blocks) are inserted immediately after the SAV (start active video) timing signal. An EAV (end active video) timing signal, a line number (LINENo) and a CRCC data segment are added at a later portion of the line.

This signal is converted to the serial data by a parallel-to-serial converter 45 and is transferred to a second output terminal (dubbing output terminal) 47, as shown in FIG. 1.

The compressed data signal with the appended timing and error correcting codes now complies with the BTS S-004 interface standard.

As shown in FIG. 1, switch 46 provided at the front stage of the second output terminal 47 can select either the compressed signal or uncompressed signal and transfer it to terminal 47. Compressed transmission signals generated at terminal 47 may be applied to dubbing input terminal 51 to record them back onto the recording medium. The dubbing input terminal 51 is connected to a serial-to-parallel conversion circuit 52 and the parallel data from the conversion circuit 52 are applied to the data stream reverse-conversion circuit 50 to restore the compressed image data to the same format as the output signal from the bit reduction encoder 14 described above.

The compressed transmission signal contains the compressed image data in the first 330 bytes (1.5 sync blocks) following the SAV signal as illustrated in FIG. 8.

Figure 9:
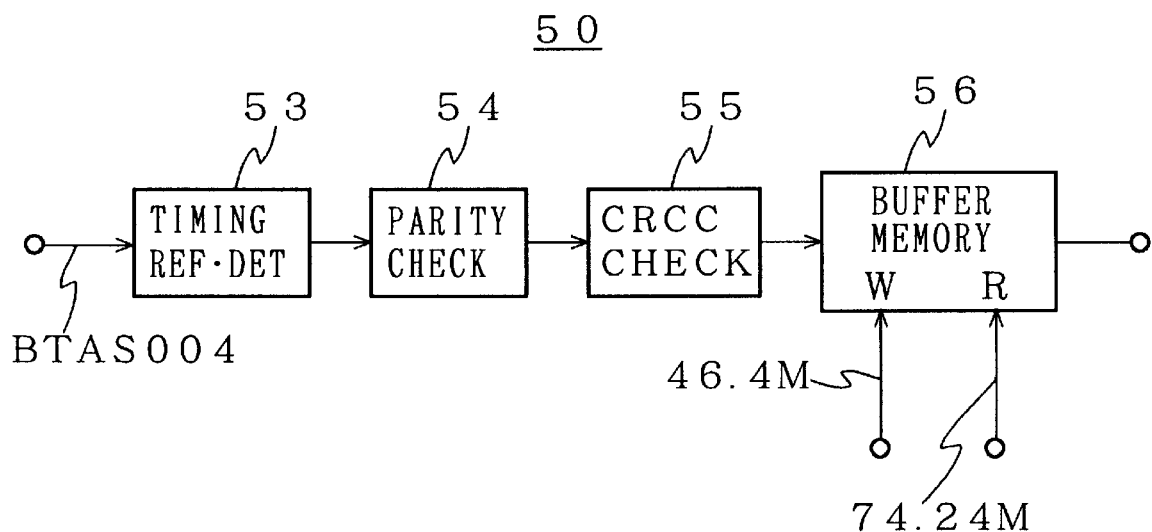
FIG. 9 is a block diagram of the data stream reverse-conversion circuit used in the embodiment of FIG. 1.
Figure 11:
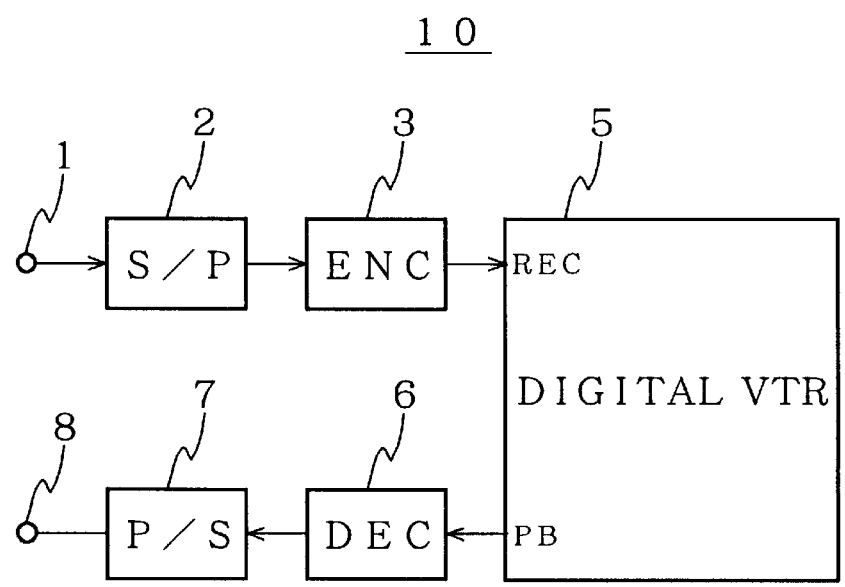
FIG. 11 is a block diagram of a conventional signal processing apparatus.

FIG. 9 is a detailed block diagram of the data stream reverse-conversion circuit 50 of FIG. 1. In FIG. 9, a timing reference detection circuit 53 extracts the timing information from the timing and error correcting signals added by the formatter 44 and produces a timing signal to be used for extracting the compressed image data. The next stage is a parity check circuit 54 that tests the even parity bit added to each byte to determine whether each sync block contains an error. A CRCC check circuit 55 at the next stage checks each sync block for errors by using the CRCC code.

If the CRCC check circuit 55 or the parity check circuit 54 finds an error, the sync block error flag is established (the flag is changed to "1") on the MSB of the identification signal ID1. This flag informs subsequent circuits that the recorded sync block contains an error. Thus, there are two error check operations to assure the quality of the compressed transmission signal.

After the error check process, a buffer memory 56 is used to convert the clock rate to obtain a signal of the format shown in FIG. 4(E), which is the internal signal format of the VTR. The writing clock rate of the memory 56 is 74.24 MHz and the readout clock rate is 46.4 MHz.

The recording sync block stream (compressed image data) described hereinbefore is multiplexed at the left edge portion of the screen as illustrated in FIG. 7. Note that FIG. 7 shows only converted data length of one of the two recorded channels. The combination of each channel results in three syncs per line. One segment contains 226 sync blocks and one frame comprises six segments for each of two channels. Therefore, one frame contains 226×6×2=2,712 sync blocks.

When the compressed image data are multiplexed in sets of 1,035 lines to encompass the effective area of the video signal, the video signal horizontal sync signal is used to control the buffer memory 56.

Assuming that each line comprises three syncs, 1.5 syncs are applied to the Y signal and 1.5 syncs are applied to each of the Pr/Pb signals where the total of three syncs are multiplexed with the portion of the original video signal. Since one frame consists of 2,712/3=904 lines, the compressed image data are multiplexed at 904 lines in the video area of 1,035 lines as shown in FIG. 7.

The rate conversion process produces compressed image data that matches the recording stream shown in FIG. 4(E) and is applied through the switch 15 to the error correction code encoder 16, as shown in FIG. 1. The data are recorded on the tape T in the same manner as for the video image signal applied to the first input terminal 11 described above.

The above embodiment was described using a serial video data path. If the digital compressed image signal (compressed transmission signal) in the present invention is parallel video data instead of the serial video data, the signal may be converted to a transmission signal format satisfying the BTAS-002 interface standard. This modification does not require the serial-to-parallel conversion circuits 52, 45 coupled with the input/output terminals 51, 47, respectively, in FIG. 1.

Figure 10:
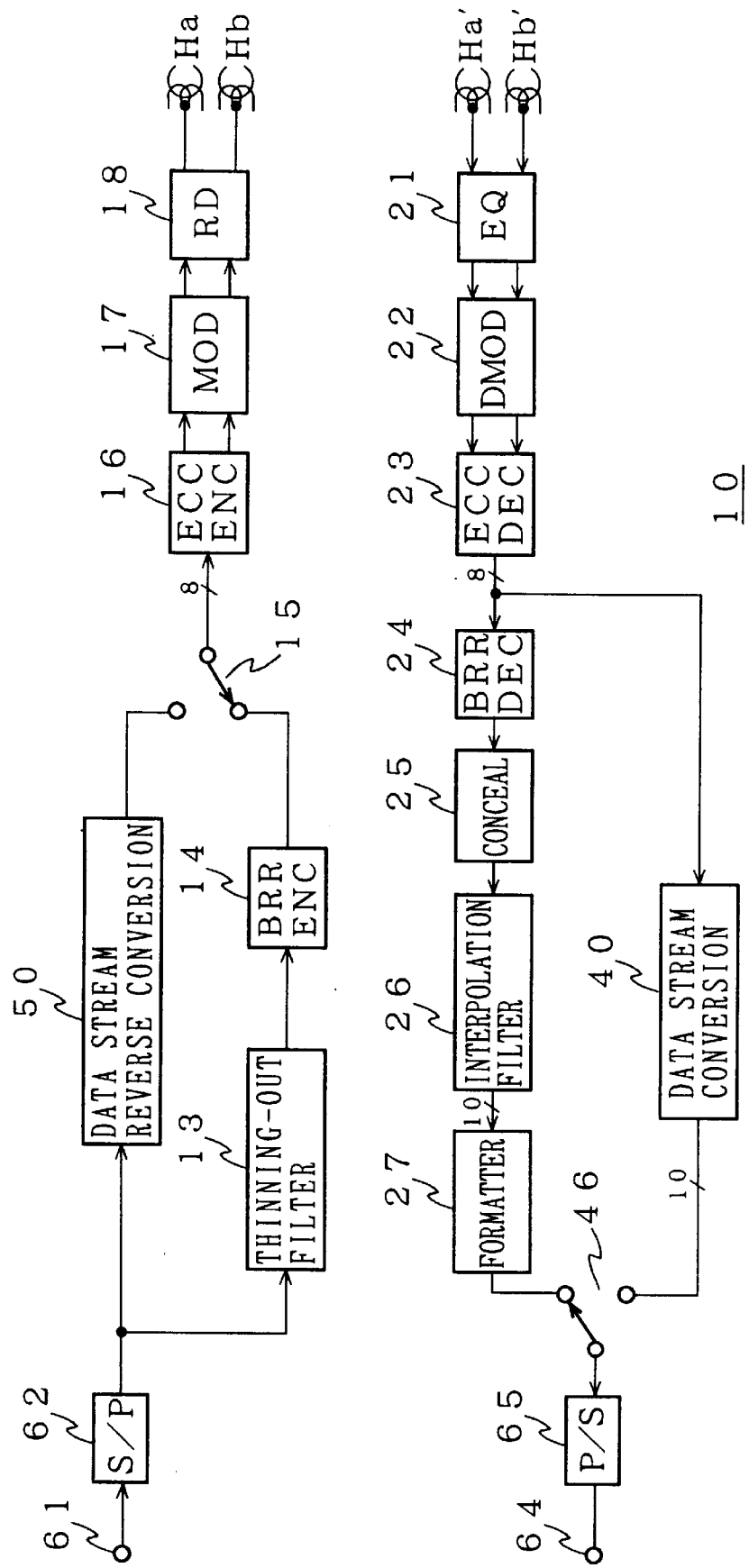
FIG. 10 is a block diagram of another embodiment of the signal processing apparatus according to the present invention.

FIG. 10 shows another embodiment of the signal processing apparatus according to the present invention in which the input and output terminals for dubbing are common with the regular input and output terminals.

More specifically, in FIG. 10 the signal recording system includes a common terminal 61 as well as a serial-to-parallel conversion circuit 62. The signal playback system includes a common terminal 64 as well as a parallel-to-serial converter 65. Therefore, the total circuit configuration is simpler than that of FIG. 1. In all other respects, this apparatus is identical to the circuit shown in FIG. 1.

The present invention is not limited to VTRs but can be applied to other signal processing apparatus handling video image signals. It is suitable for signal processing apparatus handling compressed digital image signals and signal processing apparatus handling image data whose data volume is reduced by limiting only its bandwidth.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A signal processing apparatus comprising:
   a first input terminal for receiving a digital image signal;
   data compression means connected to said first input terminal for compressing the digital image signal to a predetermined number of bits for forming compressed image data;
   a second input terminal for receiving a signal in accordance with a standard video interface having compressed image data inserted in an image portion of said signal determined by said standard video interface and where said compressed image data having been inserted is of a same type as said compressed image data compressed by said data compression means;
   a signal reverse-conversion circuit connected to said second input terminal for extracting the inserted compressed image data from said signal received at said second input terminal;
   selection means connected to said reverse-conversion circuit and said data compression means for selecting one of the compressed image data from said signal reverse-conversion means and the compressed image data from said compression means;
   an encoder connected to said selection means for adding an error detection code to the compressed image data selected by said selection means; and
   recording means connected to said encoder for recording said image data selected by said selection means.

2. The signal processing apparatus according to claim 1 wherein said recording means comprises a digital video tape recorder.

3. The signal processing apparatus according to claim 1 wherein said signal reverse-conversion circuit includes:
   means for checking a parity of the compressed image data;
   means for checking said error detection code added by said error detection encoder for identifying an error in said compressed image data; and
   a data rate conversion memory for converting a data rate of said compressed image data.

4. The signal processing apparatus according to claim 3 wherein said data rate conversion memory receives as a write clock frequency a sampling frequency of said standard video interface and as a readout clock frequency a clock frequency for said recording means.

5. A signal processing apparatus comprising:
   reproducing means for reproducing a digital compressed image signal recorded on a recording medium;
   a decoder connected to said reproducing means for performing error correction on said digital compressed image signal based on error correction codes contained in said compressed image signal;
   data extension means connected to said decoder for reconstructing a digital image signal from said compressed image signal at a bit rate prior to compression and producing a reconstructed digital image signal;
   a first output terminal connected to said data extension means for outputting said reconstructed digital image signal;
   signal conversion means connected to said decoder for converting said compressed image signal to a standard interface format by inserting said compressed image data into an image signal insertion portion of a standard interface signal and producing a formatted image signal; and
   a second output terminal connected to said signal conversion means to output said formatted image signal.

6. The signal processing apparatus according to claim 5, wherein said signal conversion means includes:
   a data rate conversion memory for converting a data rate of said compressed image signal;
   an addition circuit for adding an error detection signal to each sync block of said compressed image data;
   a parity addition circuit for adding a parity code to said standard interface signal; and a formatter for formatting said standard interface signal.

7. The signal processing apparatus according to claim 6 wherein said data rate conversion memory receives as a write clock frequency a clock frequency of said reproducing means and as a readout clock frequency a sampling frequency for said standard interface signal, whereby said memory is used to compensate for a delay caused by a difference between said clock frequencies such that the digital image signals at said first and second output terminals are synchronous.

8. A signal processing apparatus comprising:

reproducing means for reproducing a digital-compressed image signal recorded on a recording medium;

a decoder connected to said reproducing means for performing error correction on said digital-compressed image signal based on error correction codes contained in said digital-compressed image signal;

data extension means connected to said decoder for reconstructing a digital image signal from said digital-compressed image signal at a bit rate prior to compression and producing a reconstructed digital image signal;

signal conversion means connected to said decoder for converting said digital-compressed image signal to a standard interface format by inserting said digital-compressed signal data into an image signal insertion portion of a standard interface signal determined by said standard interface format and producing a formatted image signal;

selection means connected to said data extension means and said signal conversion means for selecting said reconstructed digital image signal or said formatted image signal; and an output terminal connected to said selection means for outputting said selected signal.

9. A signal processing apparatus, comprising:

a first input terminal to receive a digital image signal;

data compression means connected to said first input terminal for compressing the received digital image signal to a predetermined number of bits for forming compressed image data;

a second input terminal for receiving a signal in accordance with a standard video interface having compressed video image data inserted in an image portion of said signal determined by said standard video interface and where said inserted data is of a same type as said compressed image data from said data compression means;

a signal reverse-conversion circuit connected to said second input terminal for extracting said compressed video image data from said signal in accordance with the standard video interface;

selection means connected to said signal reverse-conversion circuit and said data compression means for selecting one of the compressed video image data from said signal reverse-conversion means and the compressed image data from said compression means and forming selected image data;

an encoder connected to said selection means for adding an error detection code to the selected image data;

recording means connected to said encoder for recording said selected image data;

reproducing means for reproducing said recorded image data;

a decoder connected to said reproducing means for performing error correction on said reproduced image data based on said error detection code added by said encoder and producing error-connected reproduced image data;

data extension means connected to said decoder for reconstructing a digital image signal from said error corrected image data with a bit rate equal to a bit rate of said digital input signal at said first input terminal and producing a reconstructed digital image signal;

a first output terminal connected to said data extension means to output said reconstructed digital image signal;

signal conversion means connected to said decoder for converting said error-corrected reproduced image data to a standard interface format by inserting said error-corrected reproduced image data into an image signal insertion portion determined by the standard video interface and producing a formatted image signal; and a second output terminal connected to said signal conversion means for outputting said formatted image signal.

* * * * *